United States Patent
Nevrekar et al.

(10) Patent No.: US 10,552,429 B2
(45) Date of Patent: Feb. 4, 2020

(54) DISCOVERY OF DATA ASSETS USING METADATA

(71) Applicant: Microsoft Technology Licensing, LLC, Redmond, WA (US)

(72) Inventors: Narayan Nevrekar, Sammamish, WA (US); Venkat Siva Sai Krishna Khanderao, Redmond, WA (US); Francisc Stugren, Seattle, WA (US); Atul Bhartia, Bothell, WA (US); Kevin Joseph Fischer, Redmond, WA (US); Scott Walter Rosemund, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 455 days.

(21) Appl. No.: 15/341,779

(22) Filed: Nov. 2, 2016

(65) Prior Publication Data
US 2018/0121433 A1    May 3, 2018

(51) Int. Cl.
*G06F 16/2457* (2019.01)
*G06T 11/20* (2006.01)
*G06F 16/22* (2019.01)
*G06F 16/2455* (2019.01)
*G06F 16/248* (2019.01)

(52) U.S. Cl.
CPC ........ *G06F 16/24578* (2019.01); *G06F 16/22* (2019.01); *G06F 16/248* (2019.01); *G06F 16/2455* (2019.01); *G06T 11/206* (2013.01)

(58) Field of Classification Search
CPC .. G06T 11/206; G06F 16/24578; G06F 16/22; G06F 16/2455; G06F 16/248

USPC .................................................. 707/722, 723
See application file for complete search history.

(56) References Cited

U.S. PATENT DOCUMENTS

| | | |
|---|---|---|
| 6,732,100 B1 | 5/2004 | Brodersen et al. |
| 6,993,533 B1 * | 1/2006 | Barnes .................. G06F 16/248 |
| | | 707/999.104 |
| 7,689,624 B2 | 3/2010 | Huang et al. |
| 7,752,201 B2 | 7/2010 | Anderson et al. |
| 8,060,463 B1 | 11/2011 | Spiegel |

(Continued)

OTHER PUBLICATIONS

Washio, et al., "State of the art of graph-based data mining", In Journal of ACM SIGKDD Explorations Newsletter, vol. 5, Issue 1, Jul. 2003, pp. 59-68.

(Continued)

*Primary Examiner* — Phong H Nguyen
(74) *Attorney, Agent, or Firm* — Holzer Patel Drennan

(57) ABSTRACT

Data assets, such as streams, databases, spreadsheets, or other data sources or types, are identified and representations of the data asset are stored. The representation of a data asset includes a schema used by the data asset, a location of the data asset, and keywords or other descriptive information. The representations of each data asset are indexed, and a search interface is provided that allows users to search for relevant data assets. In addition, dependencies, or other relationship information, among the various data assets is maintained and is used to generate a graph that shows the interrelatedness of the data assets. The graph can be explored by users to select data assets, and used to alert users when a change has been made to a data asset that may affect a data asset that they have used.

23 Claims, 9 Drawing Sheets

(56) References Cited

U.S. PATENT DOCUMENTS

| | | | |
|---|---|---|---|
| 8,504,490 B2 | 8/2013 | Nie et al. | |
| 8,782,039 B2 | 7/2014 | Byrne et al. | |
| 9,317,569 B2 | 4/2016 | Nie et al. | |
| 9,715,556 B2* | 7/2017 | Sekharan | G06F 16/972 |
| 2007/0174308 A1* | 7/2007 | Rausch | G06F 16/283 707/999.1 |
| 2010/0070446 A1* | 3/2010 | Shipman | G06N 7/005 706/46 |
| 2010/0312644 A1* | 12/2010 | Borgs | G06Q 10/10 705/14.55 |
| 2012/0005205 A1 | 1/2012 | Bobick et al. | |
| 2013/0024439 A1 | 1/2013 | Reinholdtsen et al. | |
| 2013/0159288 A1* | 6/2013 | Nikankin | G06Q 40/025 707/722 |
| 2016/0019360 A1* | 1/2016 | Pahwa | G06F 19/3418 705/3 |
| 2016/0179945 A1 | 6/2016 | Lastra Diaz et al. | |
| 2017/0052766 A1* | 2/2017 | Garipov | G06F 8/34 |
| 2017/0177625 A1* | 6/2017 | Lam | G06F 16/211 |
| 2017/0359361 A1* | 12/2017 | Modani | H04L 63/1425 |
| 2018/0039399 A1* | 2/2018 | Kaltegaertner | G06F 3/04817 |
| 2018/0130153 A1* | 5/2018 | Nielsen | G06Q 50/18 |
| 2018/0278640 A1* | 9/2018 | Modani | H04L 63/1425 |

OTHER PUBLICATIONS

Wu, et al., "Data mining with big data", In Journal of IEEE Transactions on Knowledge and Data Engineering, vol. 26, No. 1, Jan. 2014, pp. 97-107.

Webber, et al., "Graph Databases in the Enterprise: Graph-Based Search", in White Paper of Neo4j, Nov. 9, 2015, 3 pages.

True, Joseph, "Data, Discover and Display—the new Watson Analytics User Experience", Published on: May 25, 2016 Available at: https://www.ibm.com/communities/analytics/watson-analytics-blog/data-discover-and-display-the-new-watson-analytics-user-experience/.

* cited by examiner

DISCOVERY OF DATA ASSETS USING METADATA

BACKGROUND

In this modern era of computing, data assets are ubiquitous and drive many businesses. Data assets are the central input source of many systems, and are often produced as target feeds to other sub-systems. Examples of data assets include logs for monitoring system health, and logs for auditing and tracking compliance to meet regulations.

While there are numerous data assets available, users may have difficulty discovering and making use of data assets. For example, each data asset may have a different schema, structure, volume, and frequency at which they are produced, making incorporating and discovering individual data assets difficult. Each data asset may reside at a different location, and there is currently no centralized system or search engine that can be used to search for and locate relevant data assets. Moreover, even when a relevant data asset is located and incorporated into a system, there is no easy way to determine when a change has been made to the data asset which may cause problems for any system that relies on the data asset.

SUMMARY

Data assets, such as streams, databases, spreadsheets, or other data sources or types, are identified and representations of the data asset are stored. The representation of a data asset includes a schema used by the data asset, a location of the data asset, and keywords or other descriptive information. The representations of each data asset are indexed, and a search interface is provided that allows users to search for relevant data assets using a centralized service. In addition, dependencies, or other relationship information, among the various data assets is maintained and is used to generate a graph that shows the interrelatedness and lineage of the data assets. The graph can be explored by users to select data assets, and used to alert users when a change has been made to a data asset that may affect a data asset that they have used or are interested in.

In an implementation, a system for identifying data assets available from disparate sources and for storing metadata associated with the identified data assets to allow for the discovery of the identified data assets using queries from a centralized service is provided. The system includes at least one computing device and a data asset engine. The data asset engine may be adapted to: identify a first data asset available from a first source, wherein the first data asset includes a first schema; based on the identified first data asset, generate first metadata for the first data asset, wherein the first metadata includes the first schema and information about the first data asset; store the generated first metadata with an indicator of the identified first data asset; identify a second data asset available from a second source different from the first source, wherein the second data asset includes a second schema, and further wherein the second data asset is dependent on the first data asset; based on the identified second data asset, generate second metadata for the second data asset, wherein the second metadata includes the second schema and information about the second data asset, and further wherein the second metadata includes information indicating that the second data asset is dependent on the first data asset; and store the generated second metadata with an indicator of the identified second data. The user-interface may be adapted to: generate graphical representations of the first data asset and the second data asset; and provide the graphical representations, wherein the graphical representations include the information indicating the dependency of the second data asset on the first data asset.

In an implementation, a system for storing metadata associated with data assets available from disparate sources to allow for the discovery of data assets using queries from a centralized service is provided. The system includes at least one computing device, a user-interface, and a data asset engine. The user-interface may be adapted to receive a query. The data asset engine may be adapted to: for each of a plurality of data assets, store metadata for the data asset, wherein the metadata for a data asset comprises a schema used by the data asset, descriptive information about the data asset, and dependency information about the data asset, wherein each data asset of the plurality of data assets is available from a different source; and identify a subset of the plurality of data assets that are responsive to the query based on the descriptive information about each data asset. The user-interface may be further adapted to provide graphical representations of a portion of the descriptive information about one or more data assets of the identified subset of data assets and a portion of the dependency information about the one or more data assets of the identified subset of data assets.

In an implementation, a method for generating data assets available from disparate sources and for storing metadata associated with the generated data assets to allow for the discovery of the generated data assets using queries from a centralized service is provided. The method includes: receiving a selection of a first data asset by a computing device, wherein the first data asset includes a first schema and is available from a first source, and further wherein the first data asset is associated with first metadata that includes the first schema and information about the first data asset; generating a second data asset from the first data asset by the computing device, wherein the second data asset includes a second schema and is available from a second source different from the first source, and further wherein the second data asset is dependent on the first data asset; generating second metadata for the second data asset by the computing device, wherein the second metadata includes the second schema and information about the second data asset, and further wherein the second metadata includes information indicating that the second data asset is dependent on the first data asset; receiving a query by a user-interface of the computing device; determining that the query matches the first metadata by the computing device; in response to the determination that the query matches the first metadata, generating a graphical representation of a portion of the first metadata by the computing device, wherein the portion includes the information indicating that the second data asset is dependent on the first data asset; and providing the graphical representation of the portion of the first metadata by the user-interface of the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
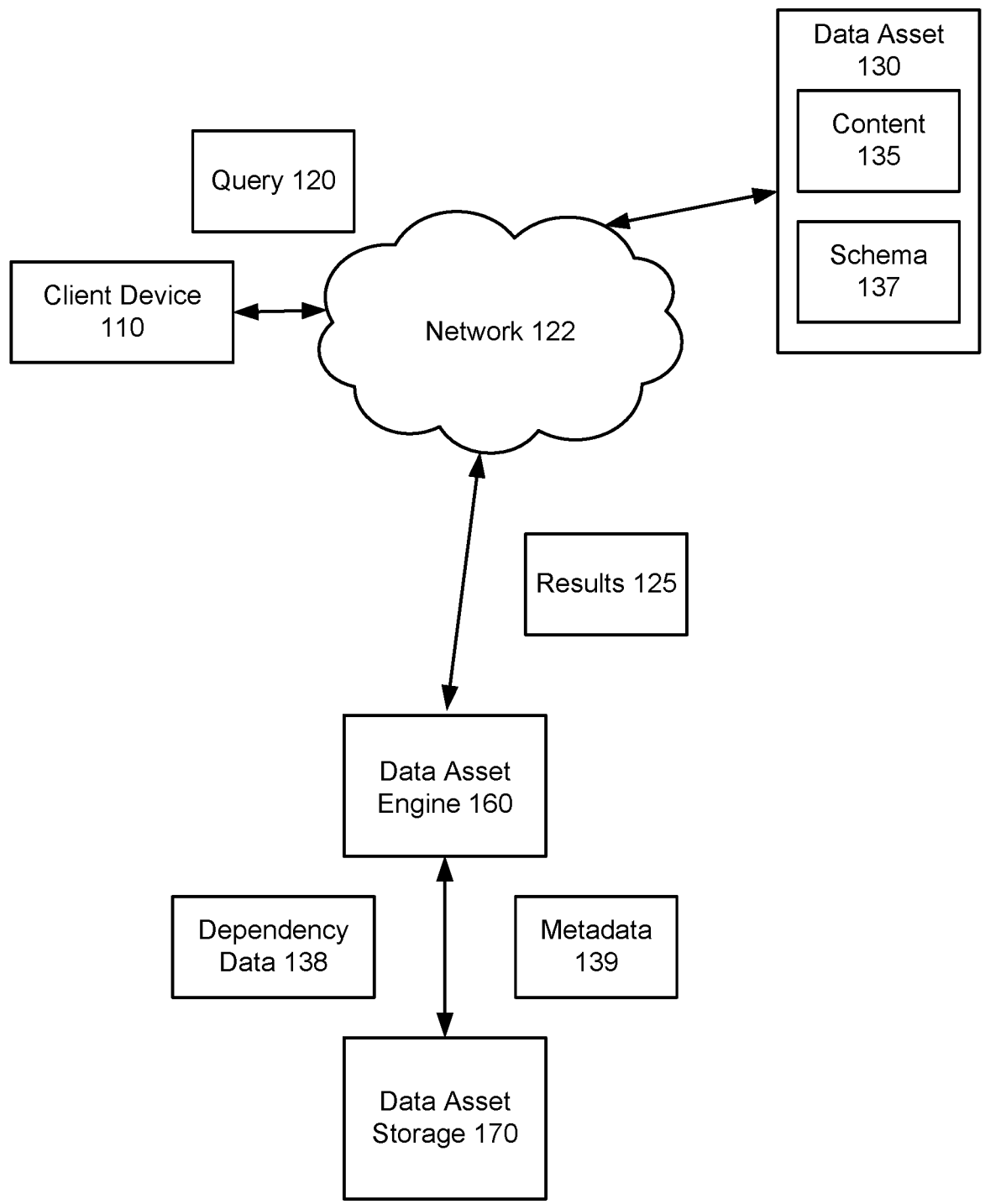
FIG. 1 is an illustration of an exemplary environment for identifying data assets, and for providing an interface that allows users to search for relevant data assets, create new data assets, and to discover dependencies or other relationships between existing data assets.

FIG. 1 is an illustration of an exemplary environment 100 for identifying data assets, and for providing an interface that allows users to search for relevant data assets, create new data assets, and to discover dependencies or other relationships between existing data assets. The environment 100 may include a data asset engine 160 and a client device 110 in communication through a network 122. The network 122 may be a variety of network types including the public switched telephone network (PSTN), a cellular telephone network, and a packet switched network (e.g., the Internet). Although only one client device 110 and one data asset engine 160 are shown in FIG. 1, there is no limit to the number of client devices 110 and data asset engines 160 that may be supported.

Figure 9:
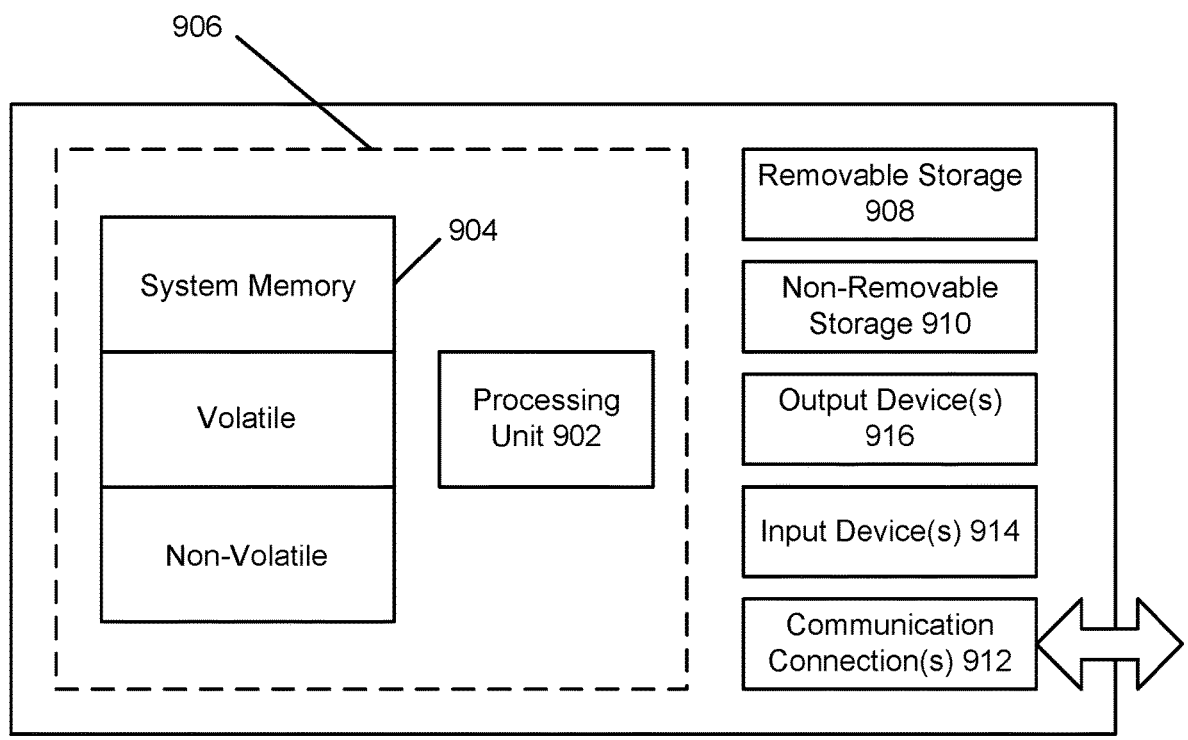
FIG. 9 shows an exemplary computing environment in which example embodiments and aspects may be implemented.

The client device 110 and the data asset engine 160 may be implemented using a variety of computing devices such as smart phones, desktop computers, laptop computers, tablets, and video game consoles. Other types of computing devices may be supported. A suitable computing device is illustrated in FIG. 9 as the computing device 900.

A data asset 130 may be a collection of data such as a record or a group of records. Data assets 130 may include data that describes people, things, actions, places, computers, dates, times, etc. An example data asset 130 associated with a person may include a record of the person's name, height, weight, and age. An example data asset 130 associated with a computer may include a record of the computer's model number, age, operating system, and last known location.

Data assets 130 can also be constructed from other data assets 130. Thus, a collection of all data assets 130 representing people over a certain age is itself a data asset 130.

Data assets 130 can come in a variety of formats. Example formats include databases, tables, spreadsheets, and other structured data formats. A data asset 130 may be stored at a particular location, such as a server or other computer. The stored data asset 130 may be retrieved using a URL or other indicator. Alternatively, a data asset 130 may be periodically or continuously streamed from a server or other computer. The streamed data asset 130 may be viewed or consumed by subscribing to the stream.

As may be appreciated, users such as publishers, researchers, and organizations may generate a large amount of data assets 130. For example, a researcher may generate a data asset 130 such as a report on housing prices and trends based on data collected from a variety of other data assets 130 that include housing-related statistics. In another example, an organization may publish a data asset 130 stream that identifies each of the computers that are active in the organization, or other devices such as printers. Because the data assets 130 may be stored at a variety of locations and sources, it may be difficult for a user to discover available data assets 130.

A data asset 130 may include content 135 and a schema 137. The content 135 may be actual attributes or other data of the data asset 130. The schema 137 may be a description of how the content 135 in the data asset 130 is organized, and what each attribute or other piece of data from the content 135 represents. For example, where a data asset 130 is a database, the data in each row may be the content 135, and the schema 137 may indicate the type of data that is found in each column of the row. Other types of schemas 137 may be used.

While data assets 130 include a variety of useful information, there is currently no easy way for users to search or view available data assets 130. For example, a researcher may view a data asset 130 such as paper published by an author on the media consumption habits of viewers. The researcher may be interested in publishing their own paper using the same data assets 130 used by the author. Currently, to obtain such data assets 130, the researcher would have to reach out to the author of the paper to obtain copies of the data assets 130 used by the author.

However, there are drawbacks associated with obtaining data assets 130 in this manner. For example, it may be difficult to locate the original author and keeper of the data assets 130. Additionally, once the researcher receives a copy of the data assets 130 from the author, if the author updates or makes changes to the data assets 130 at a later time, there is no way to ensure that the researcher receives an updated copy of the data assets 130 or is otherwise made aware of the changes to the data assets 130. Moreover, because there is no standard schema 137 that is used to generate data assets 130, if the particular data asset 130 received from the author is not well documented or is in an unusual format, it may be difficult for the researcher to make use of the data asset 130.

Accordingly, to solve the drawbacks described above, the environment 100 may include the data asset engine 160. The data asset engine 160 may identify data assets 130 that are available, and may generate and store metadata 139 generated about each identified data asset 130 in a data asset storage 170. Depending on the implementation, the metadata 139 generated about a particular data asset 130 may include information such as the schema 137 associated with the data asset 130, the location of the data asset 130, other descriptive information about the data asset 130, a general description of the content 135 of the data asset 130, and one or more authors of the data asset 130. The descriptive information may include keywords, taxonomy, tags, creation date, version number, etc. The metadata 139 may further include information such as the size or number of records associated with the data asset 130, and a date of the last time that the data asset 130 was updated or modified. The owner or creator of the data asset 130 may be able to search for the data asset 130 and further annotate the data asset 130 as needed.

The data asset engine 160 may provide a centralized service through which users may view or search for available data assets 130. For example, the data asset engine 160 may build an index, or other data structure, from the descriptive information about each of the data assets 130 from the associated metadata 139. Users may provide queries 120 to the data asset engine 160 that include keywords that describe the data assets 130 that the users are interested in. The data asset engine 160 may identify data assets 130 with metadata 139 that are responsive to the received queries 120, and may provide indicators of the identified data assets 130 to the users as the results 125. In this way, users are able to explore available data assets 130, and learn about data assets 130 that they may have otherwise not been aware of.

As described further below, the data asset engine 160 may further rank the data assets 130 that are responsive to a query 120 received from a user based on the search history of the user or the data assets 130 that the user has previously interacted with or rated. The ranking may also consider the search history of users who are known to the user or that the user has a social networking relationship with. In this way, the user is able to easily locate and discover available data assets 130 that are useful to them.

In some implementations, the data asset engine 160 may allow users to create or generate new data assets 130 from the data assets 130 identified in the data asset storage 170. For example, the user-interface provided by the data asset engine 160 may allow a user to select one or more data assets 130 to use to generate data assets 130 such as reports. The data asset engine 160 may provide a variety of statistical and data analysis tools for the users to use to create data assets 130 from the identified data assets 130. Any generated data assets 130 may be stored along with their associated metadata in the data asset storage 170.

The data asset engine 160 may monitor data assets 130 for changes and may update the metadata 139 associated with any changed data assets 130. The changes may be changes to the schema 137 or the content 135 of the data asset 130. When a change is detected in a data asset 130, the data asset engine 160 may update the metadata 139 to reflect the date on which the change was detected, as well as make any changes to the schema 137 stored in the metadata 139 to reflect any changes to the schema 137 of the descriptive information. Depending on the implementation, when a change is detected, any users who recently viewed, used, or are otherwise associated with the changed data asset 130 may be notified by the data asset engine 160.

The data asset engine 160 may generate and maintain dependency data 138 for the data assets 130. In some implementations, the dependency data 138 associated with a data asset 130 may indicate any data assets 130 that the particular data asset 130 was generated from (i.e., parent data assets 130). In addition, the dependency data 138 associated with a data asset 130 may indicate any data assets 130 that the particular data asset 130 was used to generate (i.e., child data assets 130). Initially, the dependency data 138 may be provided by the person or persons who created the data asset 130. However, when the data asset engine 160 is used to generate a data asset 130 from one or more existing data assets 130, the dependency data 138 may be generated based on the data assets 130 involved in the generation of the data asset 130.

As described in further detail below, in some implementations, the dependency data 138 may be used by the data asset engine 160 to determine when a change to a particular data asset 130 may affect one or more other data assets 130 known to the data asset engine 160. For example, when a change to a data asset 130 is detected, the data asset engine 160 may use the dependency data 138 to determine any data assets 130 that were generated from the changed data asset 130 (i.e., child data assets 130). The data asset engine 160 may modify the metadata 139 of the child data assets 130 to indicate that a change to a parent data asset 130 was made, and may alert or notify users who may be associated with the child data assets 130.

Figure 2:
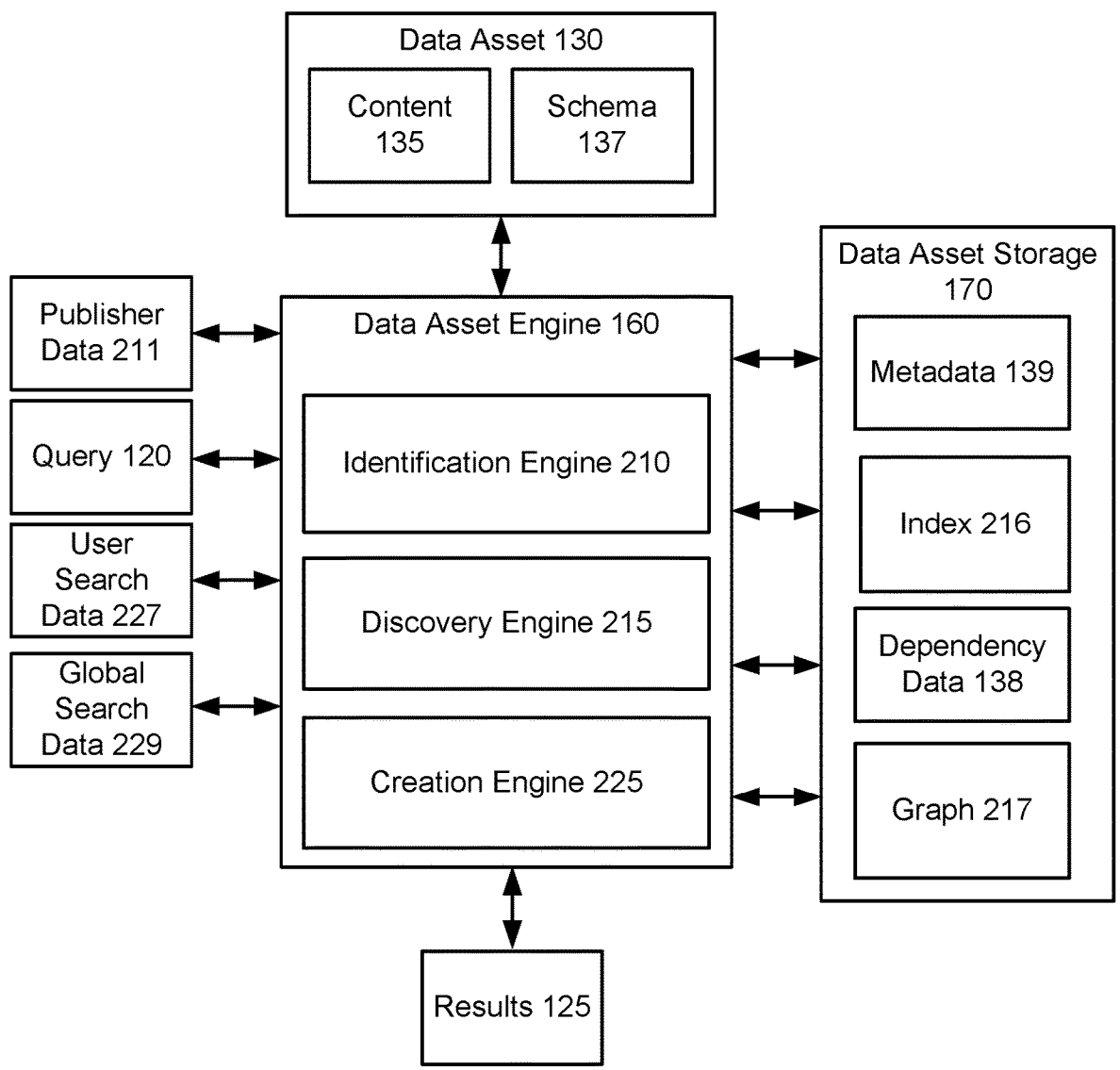
FIG. 2 is an illustration of an implementation of an exemplary data asset engine.

FIG. 2 is an illustration of an implementation of an exemplary data asset engine 160. The data asset engine 160 may include one or more components including an identification engine 210, a discovery engine 215, and a creation engine 225. More or fewer components may be included in the data asset engine 160. Some or all of the components of the data asset engine 160 may be implemented by one or more computing devices such as the computing device 900 described with respect to FIG. 9.

The identification engine 210 may identify available data assets 130, may generate metadata 139 for identified data assets 130, may detect updates or changes to one or more identified data assets 130, and may generate an index 216 based on the identified data assets 130. Other functions may be supported by the identification engine 210.

In some implementations, the identification engine 210 may identify a data asset 130 based on publisher data 211 received from one or more publishers and/or authors associated with the data asset 130. The publisher data 211 may identify the location of the data asset 130 (e.g., URL or other location indicator), the schema 137 associated with the data asset 130, and descriptive information associated with the data asset 130. The descriptive information may include information such as a title of the data asset 130, the names of the owners or authors of the data asset 130, a summary of the content 135 associated with the data asset 130, any keywords that can be used to further describe the data asset 130, a date when the data asset 130 was last edited or updated, and identifiers of any related data assets 130 (e.g., child data assets or parent data assets). The publisher data 211 may be provided to the identification engine 210 through a user-interface used to identify data assets 130, or may be provided to the identification engine 210 using some agreed upon data structure or data format.

Alternatively or additionally, the identification engine 210 may identify data assets 130 by crawling or searching for data assets 130 that are available on a network such as the Internet. For example, the identification engine 210 may use a conventional search engine to locate and identify data assets 130. In another example, a publisher or an author may identify a location such as a directory or server where data assets 130 may be made available. The identification engine 210 may periodically scan the identified locations to identify new data assets 130. In another example, where the data assets 130 are streams, the identification engine 210 may subscribe to the publisher of the streams, and may automatically identify new data assets 130 as they are streamed. In addition, the identification engine 210 may use other data assets 130 to determine the dependency and/or schema 137 for a data asset 130.

The identification engine 210 may generate the metadata 139 for an identified data asset 130 from the publisher data 211 received for the data asset 130. For example, the identification engine 210 may extract the schema 137 and other descriptive information from the publisher data 211. In implementations where no publisher data 211 is received for a data asset, or the publisher data 211 is incomplete, the identification engine 210 may determine the metadata 139 from the data asset 130. For example, the identification engine 210 may attempt to determine the schema 137 from the structure of the data asset 130, and may attempt to extract descriptive information from the content 135 of the data asset 130. The extracted descriptive information may include the names of the authors or owners of the data asset 130, keywords associated with the data assets 130, and a summary of the data asset 130. Depending on the implementation, other sources of data that may have information about the data asset 130 may be used to generate the metadata 139. These sources may include websites or webpages associated with the publisher or author of the data assets 130, for example.

The identification engine 210 may store the generated metadata 139 for each data asset 130 in the data asset storage 170. Depending on the implementation, the identification engine 210 may also store the data asset 130 in the data asset storage 170. Alternatively, rather than store the data asset 130, the identification engine 210 may store a pointer to a location where the data asset 130 resides. For example, the location may be a server associated with a publisher or an author of the data asset 130.

The identification engine 210 may periodically, or at certain predetermined or random times, determine if any changes have been made to the identified data assets 130, and if so, may update the stored metadata 139. For example, the identification engine 210 may update the update date associated with the metadata 139, or may update the schema 137. In some implementations, the identification engine 210 may retrieve each data asset 130 from its associated location to determine if any changes or updates have been made. Alternatively or additionally, the publisher or author of the data asset 130 may inform the identification engine 210 regarding any changes. Where some or all of the data assets 130 are stored in the data asset storage 170, the identification engine 160 may be automatically informed of any updates or changes from the data asset storage 170.

The discovery engine 215 may provide a user-interface through which users may search for and view identified data assets 130. Example user-interfaces are shown with respect to FIGS. 4 and 5. Other types of user-interfaces may be supported.

To facilitate data asset 130 discovery, the discovery engine 215 may generate an index 216 from the metadata 139 associated with each identified data asset 130. The index 216 may include an entry for each identified data asset 130, along with some information that can be matched against a received query 120 to determine if the associated data asset 130 is responsive to the query 120. In some implementation, the index 216 may be generated using the descriptive information from the metadata 139 such as the name of the data asset 130, the keywords associated with the data asset 130, the names of the authors associated with the data asset 130, and the summary of the data asset 130. Other information may be included in the index 216. The generated index 216 may be stored by the discovery engine 215 in the data asset storage 170.

The discovery engine 215 may receive a query 120 from a user, and may determine data assets 130 that are responsive to the query 120 from the index 216. Some or all of the determined data assets 130 may be presented to the user as the results 125. Depending on the implementation, the discovery engine 215 may present some or all of the metadata 139 associated with each responsive data asset 130. For example, the summary, keywords, title, and size of each responsive data asset 130 may be presented. In addition, indications of related data assets 130 may also be displayed as determined based on the dependency data 138.

In some implementations, the discovery engine 215 may allow users to generate reviews or assign scores to the data assets 130. The generated reviews or assigned scores for a data asset 130 may be stored in the metadata 139 associated with each data asset 130. Depending on the implementation, the reviews or assigned scores that a user is presented with may be limited to scores and/or reviews associated with users that are associated with the user. For example, the displayed reviews may be limited to those generated by users in the same company, organization, or geographical location. As another example, the reviews and scores may be those generated by users having a social networking relationship with the user.

The discovery engine 215 may further allow users to interact with the owner or publisher of a data asset 130. For example, a user may provide feedback or ask questions about the data asset 130. The owner or publisher may respond or provide additional information about the data asset 130. The interactions associated with the data assets 130 may be stored or linked to in the metadata 139.

The discovery engine 215 may rank the responsive data assets 130 for a query 120, and may present the responsive data assets 130 according to the ranking. In some implementations, the ranking may be based on user search data 227 and global search data 229. The user search data 227 may include a history of the queries 120 generated by the user, along with indications of the data assets 130 that were ultimately viewed or selected by the user (or not viewed or selected). The user search data 227 may also include reviews or scores that may have been assigned or generated by the user with respect to other data assets 130, as well as indicators of any data assets 130 that may have been created by the user. Depending on the implementation, the data assets 130 may be ranked to favor data assets that are associated with the same team or organization of the user that generated the query 120.

The global search data 229 may be similar to the user search data 227, but may include search data collected for all users of the data asset engine 160, rather than just the user that submitted the original query 120. Depending on the implementation, the global search data 229 may be restricted to those users that are in the same organization as the user that submitted the query 120, or that have a social networking relationship with the user that submitted the query 120.

The discovery engine 215 may use the user search data 227 and/or the global search data 229 to rank the data assets 130 indicated by the results 125. Any system or method for ranking search results may be used. In some implementations, the user search data 227 and/or the global search data 229 may be used as signals to a ranking model. Other signals may be used such as the average rating or score given to the data assets 130, the age or "freshness" of the data assets 130, and the overall popularity of the data assets 130.

As another example, the results 125 could be ranked based on page view counts associated with the data assets 130, or based on how many data assets are dependent on each particular data asset 130. A data asset 130 being used (i.e., depended on) by many other data assets 130 may indicate that the data asset 130 is of a high quality.

The discovery engine 215 may further generate a graph 217 representing the various relationships between the data assets 130 identified by the data asset engine 160. In some implementations, the graph 217 may include a node for each data asset 130, and an edge between the nodes that represent dependencies between the data assets 130 as indicated by the dependency data 138. The graph 217 may be used by the data asset engine 160 to quickly determine data assets 130 that may be affected by a change to a data asset 130, for example. The generated graph 217 may be stored by the discovery engine 215 in the data asset storage 170.

Depending on the implementation, the graph 217 may also show derived relationships amongst the data assets 130. For example, two data assets 130 may not be dependent on one another, but may be related in that they are often used or viewed together by users. Such relationships may be presented to the user on the graph 217 along with the dependency relationships. The derived relationships may be shown using a different color or line weight, for example. Depending on the implementation, the user may select an option to view or hide such derived relationships. Other types of derived relationships may be supported on the graph 217.

Figure 3:
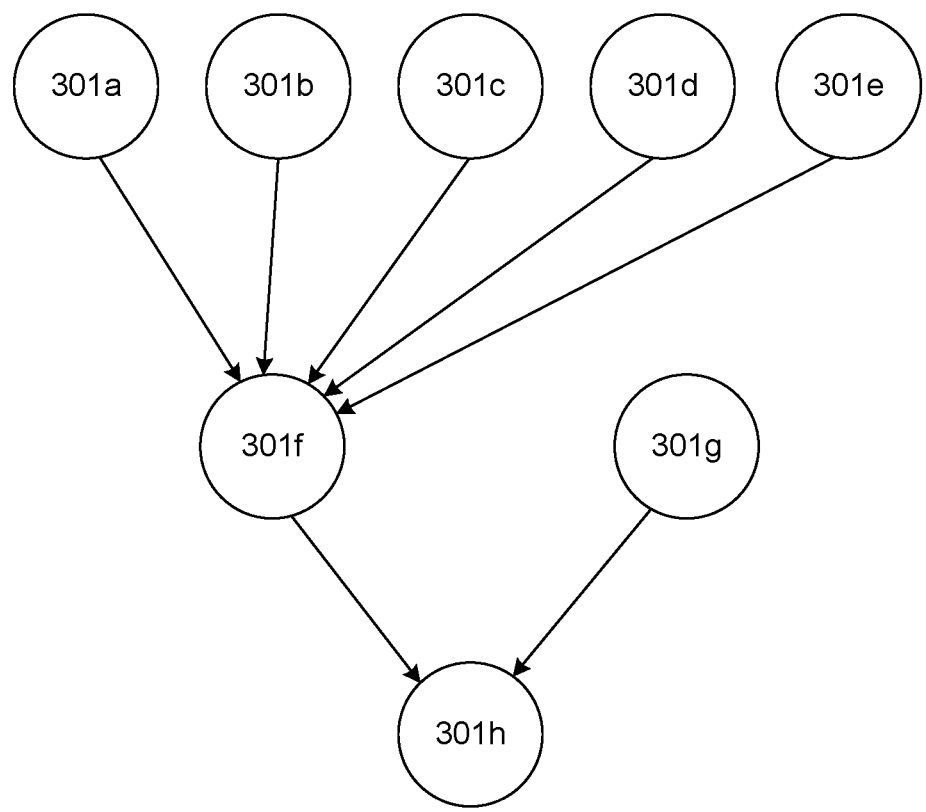
FIG. 3 is an illustration of an example graph.

FIG. 3 is an illustration of an example graph 217. As shown, the graph 217 includes eight nodes 301 (i.e., the nodes 301*a-h*). Each node 301 represents a data asset 130, and an edge between two nodes 301 indicates that there is a dependency, or other relationship, between the data assets 130 represented by the nodes 301 connected by the edge. In addition, the direction of the edge may represent the direction of the dependency (i.e., child or parent).

Based on the illustrated graph 217, the data asset 130 represented by the node 301*f* is based on content 135 from each of the data assets 130 represented by the nodes 301*a*-301*e*. For example, each of the nodes 301*a*-301*e* may represent a data asset 130 corresponding to a particular network access point used by an organization. The data assets 130 may include information such as operating temperature, uptime, interference, and total number of connected users. The node 301*f* may represent a data asset 130 such as a report that includes the information gathered from all of the network access points.

The node 301*h* may represent a data asset 130 that is generated from a combination of the data assets 130 represented by the nodes 301*f* and 301*g*. Continuing the above example, the node 301*g* may represent a data asset 130 such as an amount of electricity used by the organization at particular times. The node 301*h* may represent a data asset 130 showing a correlation between the amount of electricity used by the organization and the use of the network access points.

As may be appreciated, the data asset engine 160 may use the generated graph 217 to quickly determine what data assets 130 may be affected by a change to a particular data asset 130 based on the reachability of the nodes 301 in the graph 217. For example, based on the above graph 217, a change to the data asset 130 associated with the node 301*a* will affect the data assets 130 associated with the nodes 301*f* and 301*h* because those nodes 301 are reachable from the node 301*a*. The nodes 301*b*, 301*c*, 301*d*, 301*e*, and 301*g* are not affected because those nodes are not reachable.

Returning to FIG. 2, the creation engine 225 may allow a user to create new data assets based on one or more data assets identified by the identification engine 210. The user may browse identified data assets using the discovery engine 215. Depending on the implementation, the user may generate a data asset from a selected data asset using a variety of statistical and/or data analysis tools provided by the creation engine 225. Alternatively or additionally, the creation engine 225 may provide an interface through which the user may import selected data assets 130 into the tool or application of their choice.

The creation engine 225 may allow the user to view not only the metadata about a data asset 130, but may also allow the user to view some or all of the latest data associated with the data asset 130, such as records. The user can dynamically edit, parse, view, and aggregate the data, or can create new data assets 130 using the data.

Once the user has created a data asset 130 using the creation engine 225, the identification engine 210 may create and store metadata 139 for the created data asset 130, and the discovery engine 215 may add the data asset 130 to the index 216 as described above. The creation engine 225 may store the created data asset 130 in the data asset storage 170. Depending on the implementation, the discovery engine 215 may update the dependency data 138 and/or the graph 217 to reflect the new data asset and any existing data assets that the data asset may have been created from. Alternatively or additionally, the dependency data 138 may be stored in each data asset 130.

Figure 4:
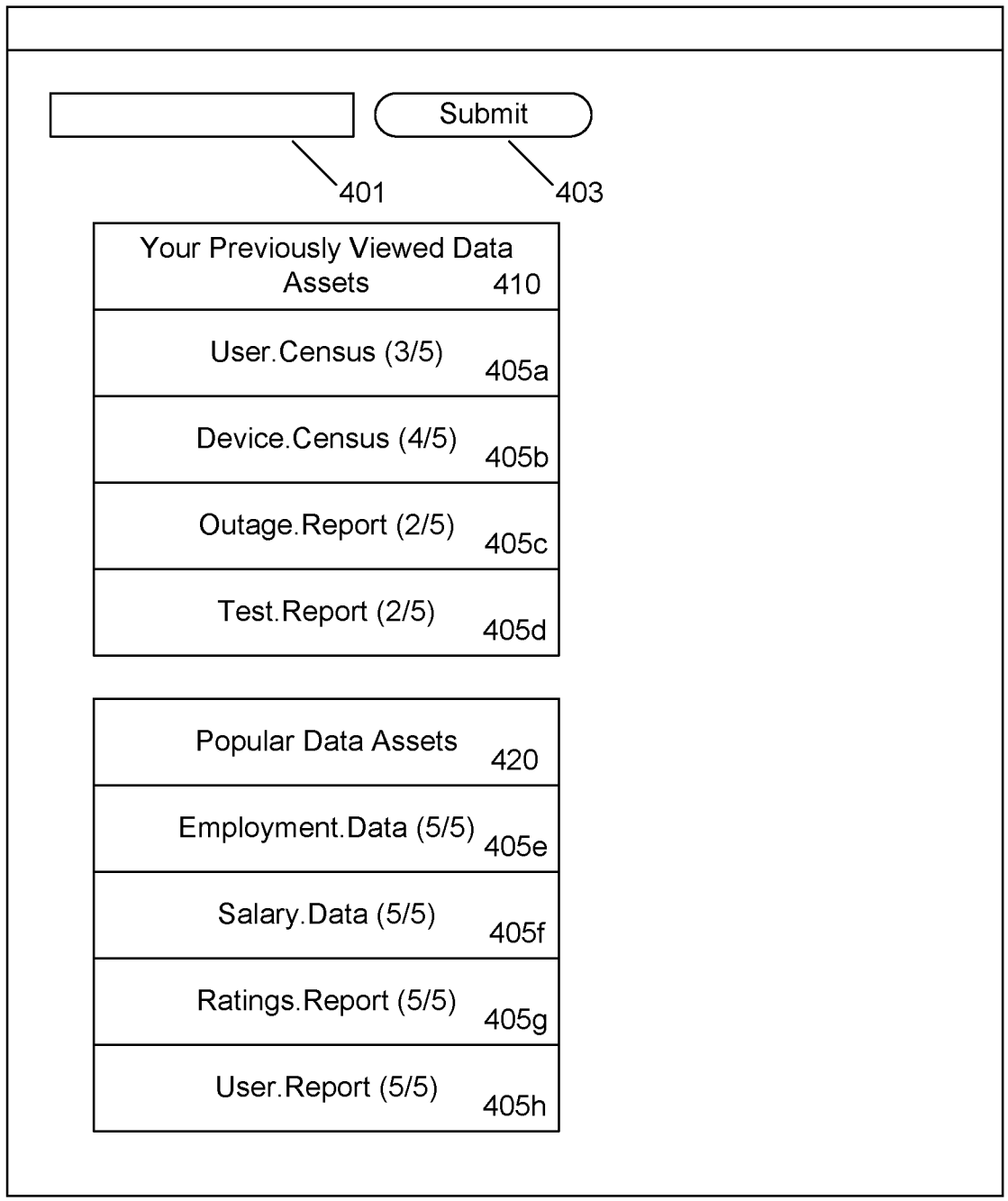
FIG. 4 is an illustration of an example user-interface for viewing and searching for data assets.

FIG. 4 is an illustration of an example user-interface 400 for viewing and searching for data assets 130. The user-interface 400 may be generated and presented to a user at a client device 110 such as a desktop computer, a laptop computer, or any portable or handheld computing device.

The user-interface 400 may be an interface that is presented to a user when the user logs into, or otherwise connects to, the data asset engine 160. In the example shown, the user is presented with two windows 410 and 420. The window 410 is labeled "Your Previously Viewed Data Assets" and includes links 405 to various data assets 130 that the user has previously viewed or interacted with. The window 410 includes links 405*a*, 405*b*, 405*c*, and 405*d* to four data assets 130 that the user may select using a mouse or some other interface such as a touch interface. As shown, each link 405 in the window 410 is shown with an associated rating (i.e., 4/5, 3/5, etc.). Similar to the links 405, the user may view reviews or ratings for a particular data asset 130 in the window 410 by selecting the associated rating through the user-interface 400. Depending on the implementation, the user may also provide their own review or rating through the user-interface 400.

The window 420 is labeled "Popular Data Assets" and includes links 405 to various data assets 130 that are popular in the data asset engine 160. The links 405*e*, 405*f*, 405*g*, and 405*h* in the window 420 may have been selected by the discovery engine 215 of the data asset engine 160 based on the number of times each of the data assets 130 were selected or viewed by a user of the data asset engine 160.

While not shown in FIG. 4, the user-interface 400 may include additional windows or user-interface elements through which data assets 130 may be recommended to the user. Examples of data assets that may be recommended include new data assets (i.e., data assets that have recently been identified by the data asset engine 160), and data assets recently used, viewed, or created by users that are associated with the user viewing the user-interface 400 (e.g., users that are in the same organization, company, team, or have a social networking relationship with the user associated with the user-interface 400). In this way, the data asset engine 160 may make the user aware of available data assets without the user having to explicitly generate a query 120.

The user-interface 400 also includes a user-interface element 401 through which the user can provide a query 120. The query 120 may be a free form text query. Other types of queries 120 may be supported such as structured queries. The user may submit the query 120 to the discovery engine 215 of the data asset engine 160 by pressing the user-interface element 403 labeled "Submit."

Figure 5:
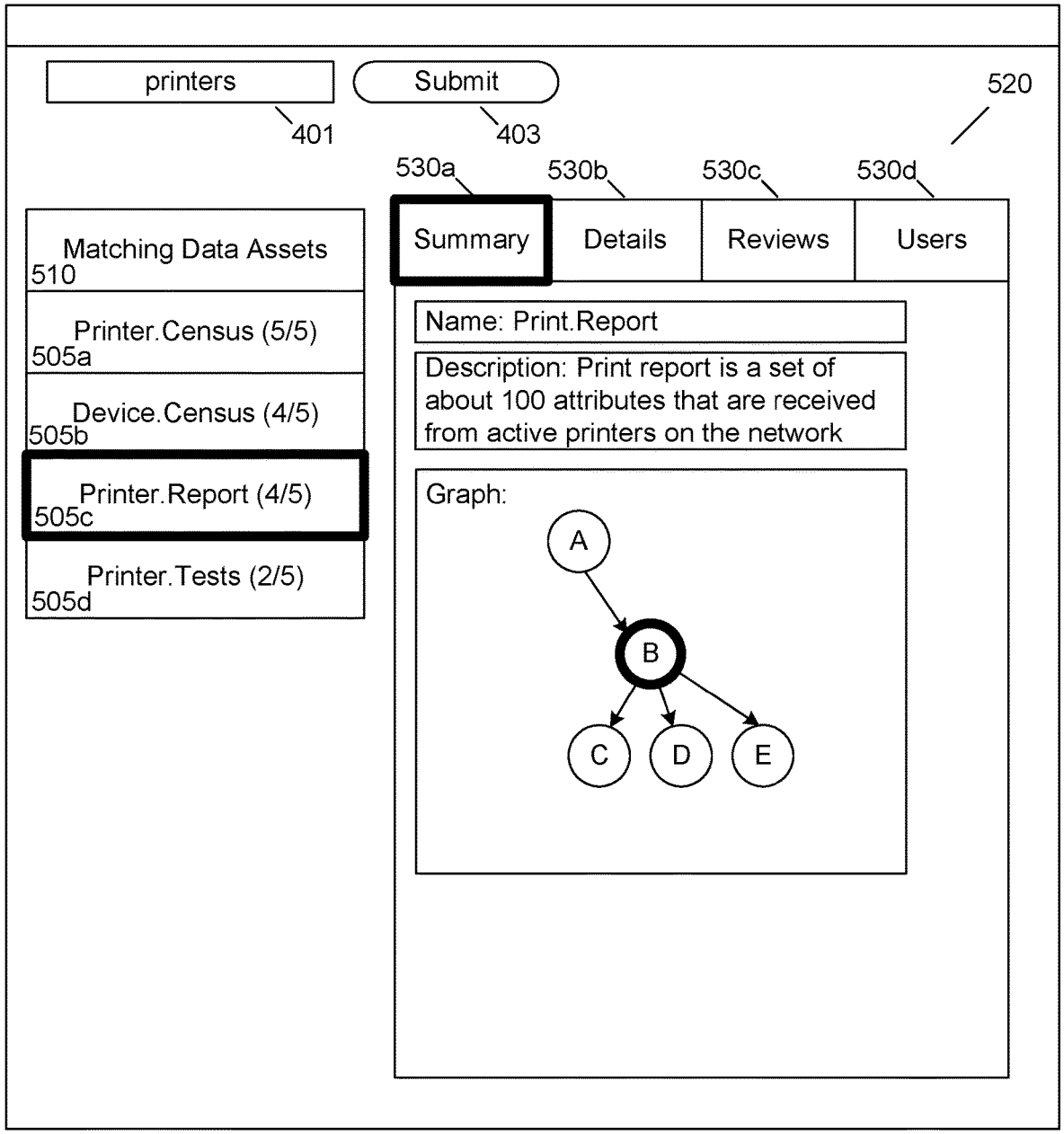
FIG. 5 is an illustration of another example user-interface for viewing and searching for data assets.

Continuing to FIG. 5, the user has entered the query 120 "printers" into the user-interface element 401 and pressed the user-interface element 403. Accordingly, the "printers" query 120 was provided to the data asset engine 160, and the discovery engine 215 generated the results 125 that include references and information associated with one or more data assets 130 that are responsive to the "printers" query 120.

As shown, links 505 to the data assets 130 that are responsive to the query 120 are shown in a window 510 labeled "Matching Data Assets." In particular, the window 510 includes a link 505a to a data asset 130 titled "Printer.Census" with an average rating of "5/5", a link 505b to a data asset 130 titled "Device.Census" with an average rating of "4/5", a link 505c to a data asset 130 titled "Printer.Report" with an average rating of "4/5", and a link 505d to a data asset 130 titled "Printer.Tests" with an average rating of "2/5".

The user-interface 400 also now includes a window 520 where information related to a selected data asset 130 can be viewed by the user. The window 520 includes tabs 530 that control what information or aspects of a selected data asset 130 are displayed. As shown, the tabs include a tab 530a titled "Summary" that when selected displays a summary of the selected data asset 130, a tab 530b titled "Details" that when selected displays more detailed information about the data asset 130, a tab 530c titled "Reviews" that when selected displays some or all of the reviews associated with the selected data asset 130, and a tab 530d titled "Users" that when selected displays the users associated with the selected data asset 130. For example, the displayed information may include information about the authors of the data asset 130 and links to other data assets associated with the authors. Other tabs may be included in the user-interface 400.

As illustrated by the darkened lines, the user has selected the link 505c corresponding to the data asset 130 titled "Printer.Report" and is viewing content associated with the selected data asset 130 that corresponds to the tab 530a labeled "Summary." In the example shown, the displayed content includes the name of the data asset 130 and a description of the data asset 130. Some or all of the displayed content may be determined by the discovery engine 215 based on the metadata 139 associated with the selected data asset 130. Depending on the implementation, other information may be displayed about the selected data asset such as size, number of records, and the names of the authors or associated users, for example.

Also shown in the window 520 is a portion of the graph 217 corresponding to the selected data asset 130. In the example shown, the graph 217 includes five nodes labeled A, B, C, D, and E. The node B (shown in darkened lines) represents the selected data asset. The node A represents a parent data asset of the selected data asset. The nodes C, D, and E represent child data assets of the selected data asset. The user may view more information about any of the data assets represented by the nodes A, C, D, and E by selecting the associated node.

Depending on the implementation, the user-interface 400 may further provide dynamic filtering and sorting to help users narrow down results based on the various attributes associated with the data assets 130. The user-interface 400 may further include an auto-completion or an auto-suggestion feature.

Figure 6:
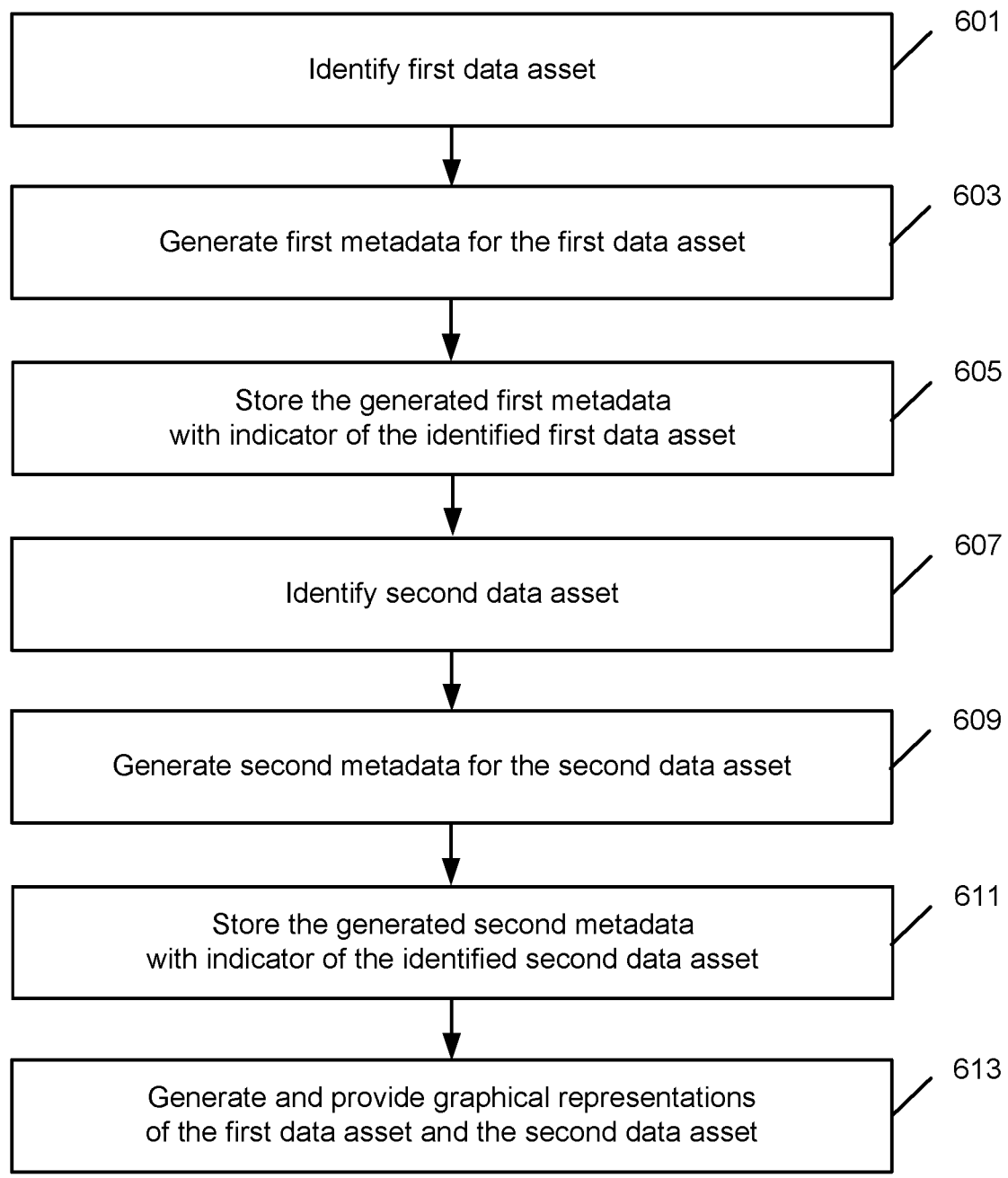
FIG. 6 is an operational flow of an implementation of a method for identifying data assets and for generating metadata based on the identified data assets.

FIG. 6 is an operational flow of an implementation of a method 600 for identifying data assets 130 and for generating metadata 139 based on the identified data assets 130. The method 600 may be implemented by the data asset engine 160.

At 601, a first data asset is identified. The first data asset 130 may be identified by the identification engine 210 of the data asset engine 160. The first data asset 130 may include data describing a variety of things, places, people, resources, etc. The first data asset 130 may be in a variety of formats including data streams, databases, spreadsheets, etc. The identified first data asset 130 may be received by the identification engine 210 by an author or user associated with the data asset 130.

In some implementations, the first data asset 130 may include first content 135 and a first schema 137. In addition, the first data asset 130 may have a location where it is stored or maintained.

At 603, first metadata is generated for the first data asset. The first metadata 139 may be generated by the identification engine 210. The first data asset may be available or located at a first source. Depending on the implementation, the first metadata 139 may include the schema 137 and descriptive information about the first data asset 130. The descriptive information may include keywords associated with the first data asset 130, a summary of the first data asset 130, the names of the authors or users that are associated with the first data asset 130, the size of the first data asset 130, the location of the first data asset 130, the number of records of the first data asset 130, and a unique identifier of the data asset 130, for example. The unique identifier may be generated using information such as the type, location, or host of the data asset 130 to ensure that the data asset 130 is not re-identified and stored as a different data asset 130. Depending on the implementation, the metadata 139 maybe generated by the identification engine 210 from the first content 135 of the first data asset 130, or may be provided by the users or authors associated with the first data asset 130.

At 605, the generated first metadata is stored with an indicator of the identified first data asset. The generated first metadata 139 and the indicator of the identified first data asset 130 may be stored in the data asset storage 170 by the identification engine 210 of the data asset engine 160. Depending on the implementation, the first data asset 130 may also be stored in the data asset storage 170.

At 607, a second data asset is identified. The second data asset may be identified by the identification engine 210 of the data asset engine 160. The second data asset may have been generated by the creation engine 225 from the first data asset. For example, where the first data asset is a table, the second data asset may have been generated by selecting some subset of the columns or rows of the table. The second data asset may be available or located at a second source that is different than the first source.

At 609, second metadata is generated. The second metadata may be generated by the identification engine 210, and may be similar to the first metadata generated at 603. The second metadata may further include dependency data 138 that indicates that the second data asset was generated from, or is dependent on, the first data asset.

At 611, the generated second metadata is stored with an indicator of the identified second data asset. The generated second metadata and the indicator of the identified second data asset may be stored in the data asset storage 170 by the identification engine 210 of the data asset engine 160.

At 613, graphical representations of the first data asset and the second data asset are generated and provided. The graphical representations may be generated by the data asset engine 210 and provided in a user-interface. The graphical representations may include information indicating that the second data asset is dependent on the first data asset.

Figure 7:
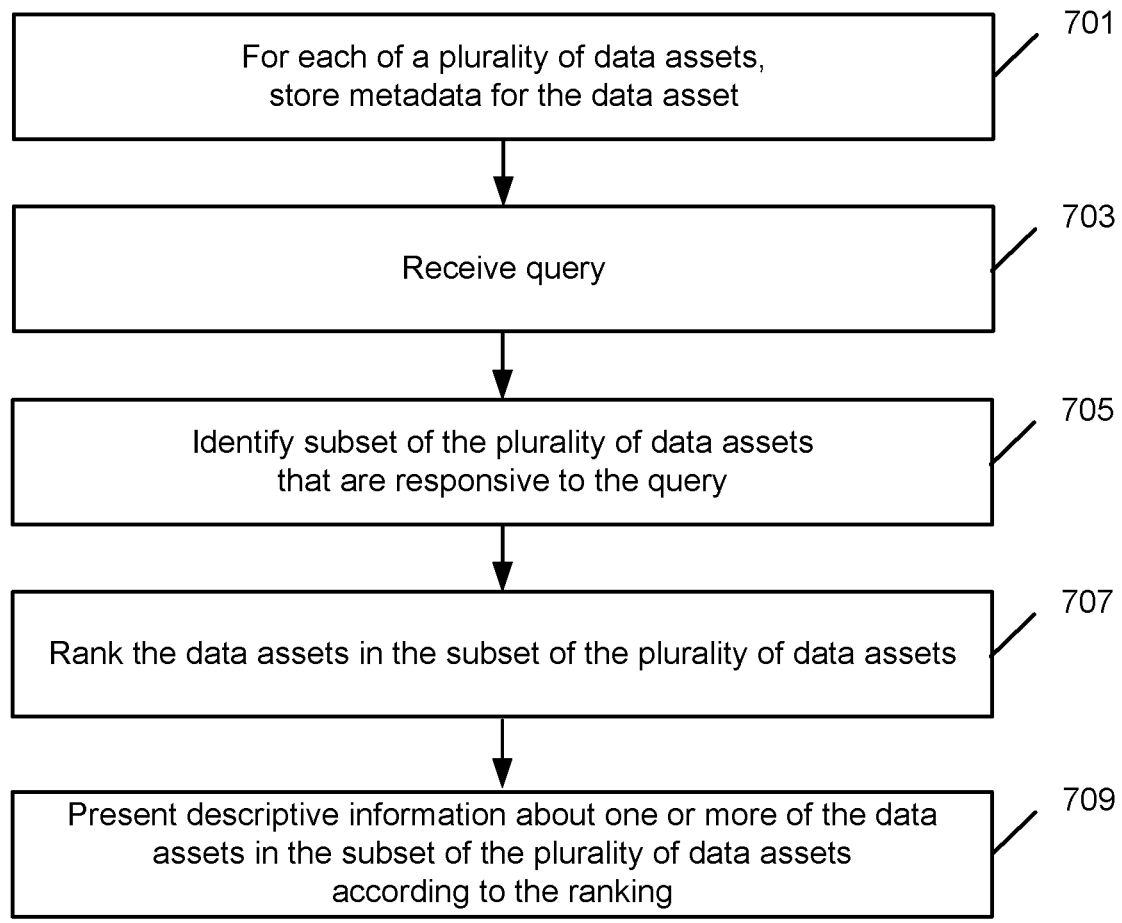
FIG. 7 is an operational flow of an implementation of a method for identifying data assets that are responsive to a query.

FIG. 7 is an operational flow of an implementation of a method 700 for identifying data assets 130 that are responsive to a query 120. The method 700 may be implemented by the data asset engine 160.

At 701, metadata is stored for each of a plurality of data assets 130. The metadata 139 may be stored by the data asset engine 160 in the data asset storage 170. Depending on the implementation, the metadata 139 stored for each data asset 130 may include a schema 137 associated with the data asset 130 and dependency data 138 associated with the data asset 130.

At 703, a query is received. The query 120 may be received by the discovery engine 215 of the data asset engine 160.

At 705, a subset of the plurality of data assets that are responsive to the query is identified. The responsive data assets may be identified by the discovery engine 215 of the data asset engine 160. Depending on the implementation, the responsive data assets may be identified by matching terms of the query 120 with information from the metadata 139 associated with each of the data assets. In some implementations, the data assets may be identified using an index 216 generated from the metadata 139 associated with each of the data assets. Other methods for identifying data assets that are responsive to a query 120 may be used.

At 707, the data assets in the subset of the plurality of data assets are ranked. The data assets in the subset of data assets may be ranked by the discovery engine 215 using user search data 227 and global search data 229. The user search data 227 may include data asset preferences of the user associated with the query 120. The global search data 229 may include data asset preferences of other users of the data asset engine 160. In some implementations, the discovery engine 215 may only consider global search data 229 associated with users who are known by the user associated with the query 120, or associated with users who have a social networking relationship with the user associated with the query 120.

At 709, descriptive information about one or more of the data assets in the subset of the plurality of data assets is presented. The descriptive information may be presented by the discovery engine 215 of the data asset engine 160. The descriptive information may include information taken from the metadata 139 associated with each data asset 130. The descriptive information for a data asset may be provided by displaying the descriptive information in a user-interface along with a link to the associated data asset. In some implementations, the descriptive information may be displayed by generating a graphical representation of the descriptive information and providing the graphical representation in a user-interface.

Figure 8:
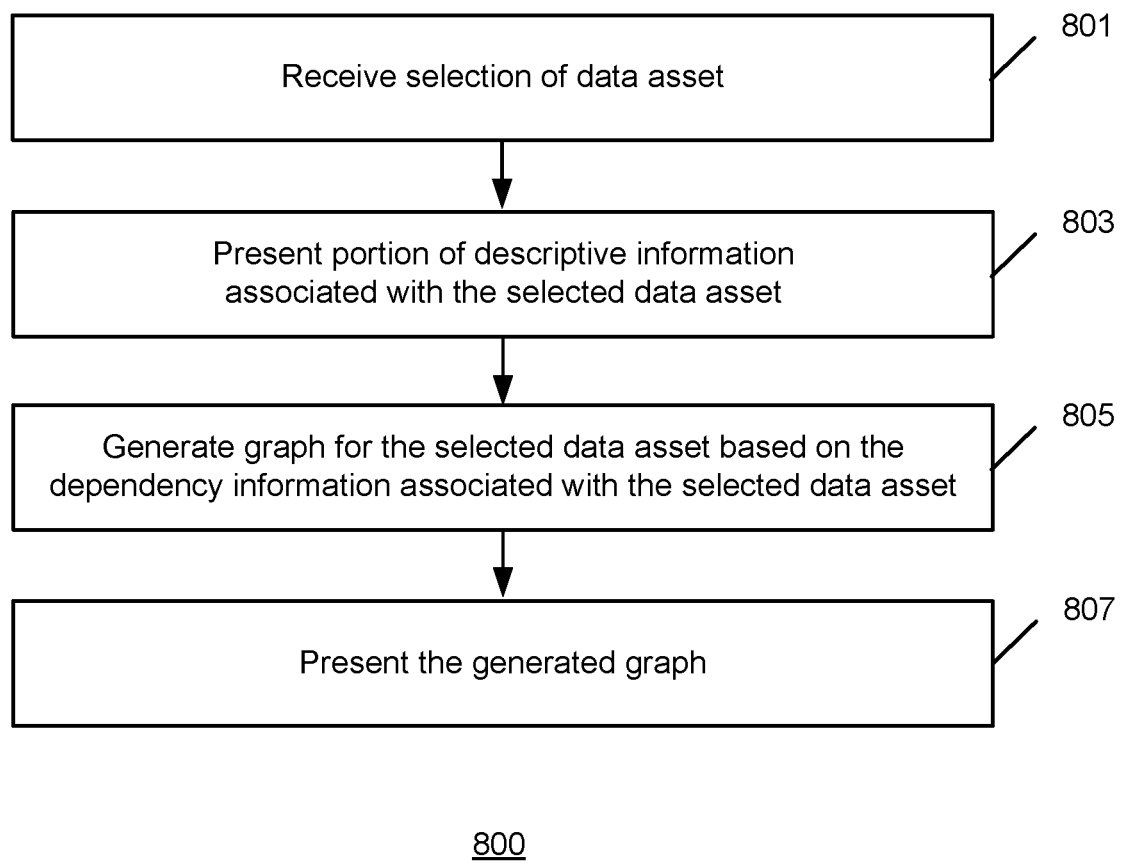
FIG. 8 is an operational flow of an implementation of a method for presenting descriptive information and a generated graph for a selected data asset.

FIG. 8 is an operational flow of an implementation of a method 800 for presenting descriptive information and a generated graph for a selected data asset 130. The method 800 may be implemented by the data asset engine 160.

At 801, a selection of a data asset is received. The selection of a data asset may be received by the discovery engine 215 of the data asset engine 160. In some implementations, the selection may be received from a user through a user-interface provided by the data asset engine 160.

At 803, descriptive information associated with the selected data asset is presented. The descriptive information may be presented by the discovery engine 215 of the data asset engine 160 by displaying the some or all of the descriptive information from the metadata 139 associated with the selected data asset. The presented descriptive information may include keywords. In some implementations, the descriptive information may be displayed by generating a graphical representation of the descriptive information and providing the graphical representation in a user-interface.

At 805, a graph is generated for the selected data asset. The graph 217 may be generated for the selected data asset 130 by the discovery engine 215 of the data asset engine 160. The graph 217 may be generated using dependency data 138 associated with the selected data asset 130 and related assets. It may include nodes for one or more of any parent data assets and nodes for one or more of any child data assets of the selected data asset 130. The generated graph 217 may also include edges that show the directions of the dependencies of the data assets represented by the nodes.

At 807, the generated graph is presented. The generated graph 217 may be presented by the discovery engine 215 of the data asset engine 160 by displaying the nodes and edges associated with the graph 217. The graph 217 may be displayed along with the descriptive information to allow the user to learn about the selected data asset as well as those data assets that were generated from the selected data asset, or that the selected data asset was generated from.

FIG. 9 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by the device 900 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 900.

Computing device 900 may contain communication connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for identifying data assets available from disparate sources and for storing metadata associated with the identified data assets to allow for the discovery of the identified data assets using queries from a centralized service is provided. The system includes at least one computing device and a data asset engine. The data asset engine may be adapted to: identify a first data asset available from a first source, wherein the first data asset includes a first schema; based on the identified first data asset, generate first metadata for the first data asset, wherein the first metadata includes the first schema and information about the first data asset; store the generated first metadata with an indicator of the identified first data asset; identify a second data asset available from a second source different from the first source, wherein the second data asset includes a second schema, and further wherein the second data asset is dependent on the first data asset; based on the identified second data asset, generate second metadata for the second data asset, wherein the second metadata includes the second schema and information about the second data asset, and further wherein the second metadata includes information indicating that the second data asset is dependent on the first data asset; and store the generated second metadata with an indicator of the identified second data. The user-interface may be adapted to: generate graphical representations of the first data asset and the second data asset; and provide the graphical representations, wherein the graphical representations include the information indicating the dependency of the second data asset on the first data asset.

Implementations may include some or all of the following features. The data asset engine may be further adapted to update the stored first metadata to include the information indicating that the second data asset is dependent on the first data asset. The data asset engine may be further adapted to determine the first schema from the first data asset. The information about the first data asset may include one or more of a location of the first data asset, one or more authors of the first data asset, keywords associated with the first data asset, and a most recent update date of the first data asset. The first metadata may include information indicating that the first data asset is dependent on a third data asset. The user-interface may be further adapted to: receive a query; determine that the query matches the first metadata; and in response to the determination that the query matches the first metadata, provide a portion of the first metadata, wherein the graphical representation of the portion includes the information indicating that the second data asset is dependent on the first data asset. The data asset engine may be further adapted to: receive an indication that an update was made to the first data asset; and in response to the indication, update the second metadata to indicate that the update was made to the first data asset. The data asset engine may be further adapted to: in response to the indication that the update was made to the first data asset, provide an alert that the update was made to the first data asset to one or more users associated with the second data asset. The data asset engine may be further adapted to generate the second data asset from the first data asset.

In an implementation, a system for storing metadata associated with data assets available from disparate sources to allow for the discovery of data assets using queries from a centralized service is provided. The system includes at least one computing device, a user-interface, and a data asset engine. The user-interface may be adapted to receive a query. The data asset engine may be adapted to: for each of a plurality of data assets, store metadata for the data asset, wherein the metadata for a data asset comprises a schema used by the data asset, descriptive information about the data asset, and dependency information about the data asset, wherein each data asset of the plurality of data assets is available from a different source; and identify a subset of the plurality of data assets that are responsive to the query based on the descriptive information about each data asset. The user-interface may be further adapted to provide graphical representations of a portion of the descriptive information about one or more data assets of the identified subset of data assets and a portion of the dependency information about the one or more data assets of the identified subset of data assets.

Implementations may include some or all of the following features. The data asset engine may be further adapted to: rank the data assets in the identified subset of data assets; and the user-interface is further adapted to provide the graphical representations of the portion of the descriptive information about one or more data assets of the identified subset of data assets and the portion of the dependency information about the one or more data assets of the identified subset of data assets according to the ranking. The query may be associated with a user. The data asset engine adapted to rank the data assets in the identified subset of data assets may include the data engine adapted to: receive user search data associated with the user; and rank the data assets in the identified subset of data assets based on the user search data. The user search data may include information related to data asset preferences associated with the user, and data asset preferences of other users having a social networking relationship with the user. The data asset engine may be further adapted to generate a graph for the one or more data assets of the identified subset of data assets based on the dependency information associated with the one or more data assets. The user-interface may be further adapted to present a graphical representation of the generated graph. Each data asset may include one or more of a data stream, a database, a report, or a spreadsheet.

In an implementation, a method for generating data assets available from disparate sources and for storing metadata associated with the generated data assets to allow for the discovery of the generated data assets using queries from a centralized service is provided. The method includes: receiving a selection of a first data asset by a computing device, wherein the first data asset includes a first schema and is available from a first source, and further wherein the first data asset is associated with first metadata that includes the first schema and information about the first data asset; generating a second data asset from the first data asset by the computing device, wherein the second data asset includes a second schema and is available from a second source different from the first source, and further wherein the second data asset is dependent on the first data asset; generating second metadata for the second data asset by the computing device, wherein the second metadata includes the second schema and information about the second data asset, and further wherein the second metadata includes information indicating that the second data asset is dependent on the first data asset; receiving a query by a user-interface of the computing device; determining that the query matches the first metadata by the computing device; in response to the determination that the query matches the first metadata, generating a graphical representation of a portion of the first metadata by the computing device, wherein the portion includes the information indicating that the second data asset is dependent on the first data asset; and providing the graphical representation of the portion of the first metadata by the user-interface of the computing device.

Implementations may include some or all of the following features. The method may further include: receiving an indication that an update was made to the first data asset; and in response to the indication that the update was made to the first data asset, updating the second metadata to indicate that the update was made to the first data asset. The method may further include, in response to the indication that the update was made to the first data asset, providing an alert that the update was made to the first data asset to one or more users associated with the second data asset. The method may further include updating the first metadata to include the information indicating that the second data asset is dependent on the first data asset. The first metadata may include information indicating that the first data asset is dependent on a third data asset.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for identifying data assets available from disparate sources and for storing metadata associated with the identified data assets to allow for the discovery of the identified data assets using queries from a centralized service, comprising:
    at least one computing device; and
    a data asset engine adapted to:
        identify a first data asset stored at and available from a first source, wherein the first data asset includes a first schema;
        based on the identified first data asset, generate first metadata for the first data asset, wherein the first metadata includes the first schema and other information about the first data asset;
        store the generated first metadata with an indicator of the identified first data asset;
        identify a second data asset stored at and available from a second source different from the first source, wherein the second data asset includes a second schema, and further wherein the second data asset is generated from the first data asset;
        based on the identified second data asset, generate second metadata for the second data asset, wherein the second metadata includes the second schema and other information about the second data asset, and further wherein the second metadata includes information indicating that the second data asset is generated from the first data asset; and
        store the generated second metadata with an indicator of the identified second data asset; and
    a user-interface adapted to:
        generate graphical representations of the first data asset and the second data asset; and
        provide the graphical representations, wherein the graphical representations include the information indicating the second data asset is generated from the first data asset.

2. The system of claim 1, wherein the data asset engine is further adapted to update the stored first metadata to include the information indicating that the second data asset is dependent on the first data asset.

3. The system of claim 1, wherein the data asset engine is further adapted to determine the first schema from the first data asset.

4. The system of claim 1, wherein the information about the first data asset comprises one or more of a location of the first data asset, one or more authors of the first data asset, keywords associated with the first data asset, and a most recent update date of the first data asset.

5. The system of claim 1, wherein the first metadata includes information indicating that the first data asset is dependent on a third data asset.

6. The system of claim 1, wherein the user-interface is further adapted to:
receive a query;
determine that the query matches the first metadata; and
in response to the determination that the query matches the first metadata, provide a graphical representation of a portion of the first metadata, wherein the graphical representation of the portion includes the information indicating that the second data asset is dependent on the first data asset.

7. The system of claim 1, wherein the data asset engine is further adapted to:
receive an indication that an update was made to the first data asset; and
in response to the indication, update the second metadata to indicate that the update was made to the first data asset.

8. The system of claim 7, wherein the data asset engine is further adapted to, in response to the indication that the update was made to the first data asset, provide an alert that the update was made to the first data asset to one or more users associated with the second data asset.

9. The system of claim 1, wherein the data asset engine is further adapted to generate the second data asset from the first data asset.

10. A system for storing metadata associated with data assets available from disparate sources to allow for the discovery of data assets using queries from a centralized service, comprising:
at least one computing device;
a user-interface adapted to receive a query; and
a data asset engine adapted to:
for each of a plurality of data assets, store metadata for the data asset, wherein the metadata for a data asset comprises a schema used by the data asset, descriptive information about the data asset, and dependency information about the data asset, wherein each data asset of the plurality of data assets is stored at and available from a different source, the dependency information indicating that a first data asset is generated from a second data asset; and
identify a subset of the plurality of data assets that are responsive to the query based on the descriptive information about each data asset, wherein the user-interface is further adapted to provide graphical representations of a portion of the descriptive information about one or more data assets of the identified subset of data assets and a portion of the dependency information about the one or more data assets of the identified subset of data assets.

11. The system of claim 10, wherein the data asset engine is further adapted to rank the data assets in the identified subset of data assets; and the user-interface is further adapted to provide the graphical representations of the portion of the descriptive information about one or more data assets of the identified subset of data assets and the portion of the dependency information about the one or more data assets of the identified subset of data assets according to the ranking.

12. The system of claim 11, wherein the query is associated with a user, and the data asset engine adapted to rank the data assets in the identified subset of data assets comprises the data engine adapted to:
receive user search data associated with the user; and
rank the data assets in the identified subset of data assets based on the user search data.

13. The system of claim 12, wherein the user search data comprises information related to data asset preferences associated with the user, and data asset preferences of other users having a social networking relationship with the user.

14. The system of claim 10, wherein the data asset engine is further adapted to generate a graph for the one or more data assets of the identified subset of data assets based on the dependency information associated with the one or more data assets, and the user-interface is further adapted to present a graphical representation of the generated graph.

15. The system of claim 10, wherein each data asset comprises one or more of a data stream, a database, a report, or a spreadsheet.

16. A method for generating data assets available from disparate sources and for storing metadata associated with the generated data assets to allow for the discovery of the generated data assets using queries from a centralized service, comprising:
receiving a selection of a first data asset by a computing device, wherein the first data asset includes a first schema and is stored at and available from a first source, and further wherein the first data asset is associated with first metadata that includes the first schema and information about the first data asset;
generating a second data asset from the first data asset by the computing device, wherein the second data asset includes a second schema and is stored at and available from a second source different from the first source, and further wherein the second data asset is generated from the first data asset;
generating second metadata for the second data asset by the computing device, wherein the second metadata includes the second schema and information about the second data asset, and further wherein the second metadata includes information indicating that the second data asset is generated from the first data asset;
receiving a query by a user-interface of the computing device;
determining that the query matches the first metadata by the computing device;
in response to the determination that the query matches the first metadata, generating a graphical representation of a portion of the first metadata by the computing device, wherein the portion includes the information indicating that the second data asset is generated from the first data asset; and
providing the graphical representation of the portion of the first metadata by the user-interface of the computing device.

17. The method of claim 16, further comprising:
receiving an indication that an update was made to the first data asset; and
in response to the indication that the update was made to the first data asset, updating the second metadata to indicate that the update was made to the first data asset.

18. The method of claim 17, further comprising:
in response to the indication that the update was made to the first data asset, providing an alert that the update was made to the first data asset to one or more users associated with the second data asset.

19. The method of claim 16, further comprising updating the first metadata to include the information indicating that the second data asset is dependent on the first data asset.

20. The method of claim 16, wherein the first metadata includes information indicating that the first data asset is dependent on a third data asset.

21. The system of claim 1 wherein the first schema describes organization of the first data asset.

22. The system of claim 21 wherein the second schema describes organization of the second data asset.

23. The system of claim 1, wherein the first schema provides a description of the organization of content of the first data asset.

* * * * *